(12) United States Patent
Merkel et al.

(10) Patent No.: US 8,389,430 B2
(45) Date of Patent: *Mar. 5, 2013

(54) BETA-SPODUMENE-CORDIERITE COMPOSITION, ARTICLE, AND METHOD

(75) Inventors: Gregory Albert Merkel, Corning, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/954,191

(22) Filed: Nov. 24, 2010

(65) Prior Publication Data

US 2011/0130277 A1      Jun. 2, 2011

Related U.S. Application Data

(60) Provisional application No. 61/265,106, filed on Nov. 30, 2009.

(51) Int. Cl.
*C04B 35/19* (2006.01)
*C04B 35/195* (2006.01)

(52) U.S. Cl. .......... 501/118; 501/119; 501/128; 55/523; 502/250; 502/251; 502/252

(58) Field of Classification Search .................. 501/118, 501/119, 128; 55/523; 502/250, 251, 252
See application file for complete search history.

(56) References Cited

U.S. PATENT DOCUMENTS

| | | | |
|---|---|---|---|
| 3,112,184 A | 11/1963 | Hollenbach | 25/156 |
| 3,582,385 A | 6/1971 | Duke et al. | 106/390 V |
| 3,600,204 A | 8/1971 | Beall et al. | 106/39 DV |
| 3,834,981 A | 9/1974 | Grossman et al. | 161/192 |
| 3,839,001 A | 10/1974 | Adams et al. | 65/33 |
| 3,842,017 A | 10/1974 | Armistead et al. | 252/474 |
| 3,911,998 A | 10/1975 | Domicone et al. | 165/10 |
| 4,595,662 A | 6/1986 | Mochida et al. | 501/15 |
| 5,350,717 A | 9/1994 | Day et al. | 501/7 |
| 5,962,351 A | 10/1999 | Chyung et al. | 501/7 |
| 6,261,982 B1 * | 7/2001 | Takahashi et al. | 501/118 |
| 6,933,255 B2 | 8/2005 | Beall et al. | 501/128 |
| 7,618,699 B2 | 11/2009 | Beall et al. | 428/116 |
| 2002/0042339 A1 | 4/2002 | Beall et al. | 501/128 |
| 2010/0326029 A1 * | 12/2010 | Beall et al. | 55/523 |

FOREIGN PATENT DOCUMENTS

| | | |
|---|---|---|
| EP | 0630677 | 4/1990 |
| EP | 0669294 | 2/1995 |
| JP | 01297131 | * 11/1989 |
| JP | 01297145 | * 11/1989 |
| JP | 01298078 | * 12/1989 |
| JP | 02008626 | * 1/1990 |
| JP | 6-33194 | 5/1994 |
| WO | 2009/108330 | 9/2009 |
| WO | 2009/108357 | 9/2009 |

OTHER PUBLICATIONS

"Analysis of thermal stress resistance of microcracked brittle ceramics"; Hasselman et al; Ceramic Bulletin' p. 856-860, 1979.
"Reactions in the System $Li_2O$-MgO-$Al_2O_3$-$SiO_2$: II, Phase Equilibria in the High-Silica Region"; Prokopowicz et al; Department of Ceramic Technology; College of Mineral Industries, the PA State University; p. 266-278.
"The polymorphism of cordierite"; Karkhanavala et al; Journal of the American Ceramic Society; Dec. 1, 1953; vol. 36, No. 12; p. 389-392.
"Thermal expansion of Synthetic β-Spodumene and β -Spodumene-Silica Solid Solutions"; Ostertag et al; Nov. 1968; p. 651-654.
XP002632765_Abstract, Dec. 1986.

* cited by examiner

*Primary Examiner* — Karl Group
(74) *Attorney, Agent, or Firm* — Joseph M. Homa; Matthew J. Mason; Charles A. Greene

(57) ABSTRACT

Porous spodumene-cordierite honeycomb bodies of high strength but low volumetric density, useful for the manufacture of close-coupled engine exhaust converters, gasoline engine particulate exhaust filters, and NOx integrated engine exhaust filters, are provided through the reactive sintering of batches comprising sources of magnesia, alumina and silica together with a lithia source, such as a spodumene or petalite ore.

15 Claims, 3 Drawing Sheets

US 8,389,430 B2

BETA-SPODUMENE-CORDIERITE COMPOSITION, ARTICLE, AND METHOD

CROSS-REFERENCE TO RELATED APPLICATIONS

This application claims the benefit of, and priority to U.S. Provisional Patent Application No. 61/265,106 filed on Nov. 30, 2009 entitled, "Beta-Spodumene-Cordierite Composition, Article, and Method", the content of which is relied upon and incorporated herein by reference in its entirety.

FIELD

The articles and methods disclosed herein relate generally to porous ceramic material and associated porous ceramic structures, such as honeycomb structures useful as ceramic catalyst support substrates and particulate filters.

BACKGROUND

A significant challenge in delivering porous ceramic honeycomb bodies is to provide the strength required for handling, canning and use while providing high porosity and/or thin cell walls.

SUMMARY

The present disclosure encompasses spodumene-cordierite composite articles, including embodiments of such articles having a base composition within the spodumene-cordierite-silica ternary and optionally further comprising one or more minor crystal phases selected from the group consisting of mullite, spinel and corundum. Such articles include porous spodumene-cordierite honeycomb bodies having volumetric densities of less than 0.3 g/cm$^3$, and can include articles exhibiting low or no microcracking. Among further embodiments are porous honeycombs having axial modulus of rupture strengths of at least 200 psi.

The present disclosure additionally encompasses methods of forming porous ceramic articles, such as ceramic honeycomb articles, of spodumene-cordierite composition. Embodiments of those methods comprise the steps of, first, mixing inorganic batch ingredients with a liquid and an organic binder to form a plasticized batch mixture, the inorganic batch ingredients comprising sources of magnesia, silica, alumina and lithia, wherein the lithia source comprises one or more lithium-containing compounds, wherein the magnesia source comprises one or more magnesium-containing compounds, and wherein the magnesia source constitutes less than 25 wt % of the inorganic batch ingredients. The batch thus provided is then formed into a green body, and the green body is heated to a top temperature of 1180° C. to 1260° C. for a time sufficient to convert the green body into the porous ceramic article, the article being comprised of a principal phase of beta-spodumene and a minor phase of cordierite. In some embodiments of the disclosed porous articles the beta-spodumene and cordierite phases together constitute more than 80% by weight of the porous ceramic article. Also provided are embodiments wherein the porous ceramic article contains less than 4 wt % glass.

The lithia source can comprise any of the various inorganic compounds of lithium, but in some embodiments the lithia source is selected from the group consisting of spodumene, petalite, and combinations thereof. For the purpose of making honeycomb articles the plasticized batch mixture can be extruded through a honeycomb extrusion die to form a honeycomb extrudate, and the honeycomb extrudate is dried and reaction-sintered to a temperature at least sufficient to produce a spodumene-cordierite honeycomb body.

In yet another aspect the present disclosure encompasses porous ceramic bodies comprised of a principal phase of beta-spodumene and a minor phase of cordierite, wherein the beta-spodumene and cordierite phases together constitute more than 80% by weight of the body, and wherein the body contains less than 4 wt % glass. Included within the scope of that disclosure are bodies that contain less than 2 wt % glass, such as bodies wherein the beta-spodumene and cordierite phases together constitute more than 90% by weight of the body, as well as bodies containing substantially no glass. Also included within the scope of the disclosure are porous ceramic bodies having a total porosity of greater than 40% as measured by mercury intrusion porosimetry, including bodies having total mercury intrusion porosities of 40 to 60%. Further embodiments of such porous bodies have a median pore size of less than 20 μm.

The spodumene-cordierite honeycomb bodies of the present disclosure can be useful in the construction of devices such as catalytic converters and filters for the control of emissions from diesel and gasoline combustion engines. Embodiments of such devices include close-coupled engine exhaust converters incorporating spodumene-cordierite honeycomb bodies as above described having porosities greater than 35% by volume and cell wall thickness below $4\times10^{-3}$ inches. Gasoline engine particulate exhaust filters comprising spodumene-cordierite honeycomb bodies with porosities greater than 55% by volume and cell wall thicknesses below $4\times10^{-3}$ inches, as well as NOx integrated engine exhaust filters comprising spodumene-cordierite honeycomb bodies having porosities greater than 55% by volume and cell wall thicknesses below $12\times10^{-3}$ inches, are also provided. In some embodiments, a honeycomb body to be used as a catalyst substrate support is disclosed herein with high porosity (greater than 55%) and thin walls (less than 0.004 inches), which may be deployed in a pollution control system such as a close-coupled catalytic converter with fast light-off performance, or a low-pressure-drop gasoline particulate filter. In some embodiments, a honeycomb body to be used as a NOx integrated filter has a porosity greater than 65% providing high catalyst loading capacity.

Catalyst support substrates and filters disclosed herein can be useful in advanced systems for the removal of pollutants including carbon monoxide, nitrogen oxides, unburned hydrocarbons and carbonaceous particulates from gasoline and diesel combustion engine exhaust gases.

DESCRIPTION OF THE DRAWINGS

The disclosed articles, methods and devices are further described below with reference to the appended drawings, wherein.

DETAILED DESCRIPTION

Figure 1:
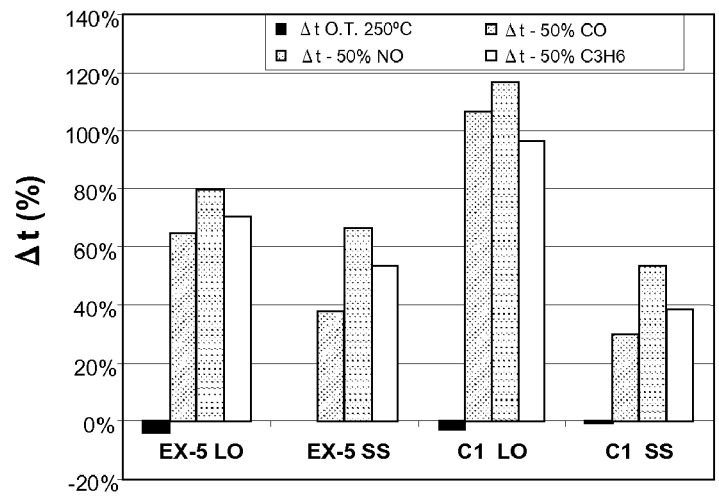
FIG. 1 presents data respecting the effects of hydrothermal aging on the catalytic performance of honeycomb catalyst substrates of differing composition.

The articles, methods and devices of the present disclosure may be used in a number of different ways for the control of harmful emissions from a variety of different pollution sources, both mobile and stationary. Therefore, while the following descriptions of particular embodiments of those articles, methods and devices are in some cases presented with particular focus on catalytic converters for gasoline engines, it will be recognized that those embodiments are offered for purposes of illustration only, and are not intended to be limiting.

Low expansion spodumene (lithium aluminosilicate) honeycombs have previously been proposed for use as turbine engine regenerators, but have not been developed for use as catalytic converter substrates. This is attributable to a number of shortcomings, including the poisoning effects of lithium on catalytic activity, a somewhat lower maximum service temperature than cordierite, and higher manufacturing costs when fabricated from glass frits, due to the expenses of glass processing and high extrusion die wear. Further, they do not offer any strength advantage over cordierite. Unexpectedly we have found that spodumene-cordierite composites within the spodumene-cordierite-silica ternary overcome the above disadvantages, allowing a predominantly spodumene-phase material to be used as a catalytic converter or gasoline particulate filter substrate offering the combined attributes of low pressure drop, high strength at high porosity, and light-off time below those available with current materials.

For the purposes of the present description the term "spodumene" in the context of a description of a ternary or quaternary composition system refers to a lithium aluminosilicate end member of $LiAl_2Si_2O_6$ composition. In other contexts, such as in the examples, the spodumene phases are typically of variable composition that will depend on the batch compositions and conditions of processing, and which may have variable percentages of the constituent oxides of lithium, aluminum, silicon, and magnesium, while still maintaining a crystal structure based upon that of beta-spodumene.

Composite porous ceramic articles provided according to the present disclosure are suitably made by reactive sintering starting with low cost, naturally occurring material such as α-spodumene, transformed α-spodumene (β-spodumene derived from the thermal transformation of α-spodumene), or petalite ores. Particularly included are embodiments wherein the inorganic batch ingredients comprise α-spodumene in an amount of at least 40 wt % with respect to the inorganic batch ingredients included in the plasticized batch mixtures. The magnesia source employed for some embodiments of the disclosed porous ceramic articles may be selected from the group consisting of MgO, magnesium hydroxide, talc, and combinations thereof.

Dissolution of magnesia, silica, and alumina components into the spodumene phase during reactive sintering, as well as the presence of the cordierite phase itself, reduce the total amount of lithium oxide that can ion exchange with the exhaust environment and exhaust condensates and lead to changes in physical properties or poisoning of supported catalysts. The addition of cordierite also enhances the refractory character of the ware, and the cordierite and the dissolved species within the spodumene phase frustrate diffusion of lithium to slow the exchange process. Finally, the addition of a second cordierite phase to the spodumene appears to limit the growth of grains or domains of subparallel-oriented grains during the process of sintering. Smaller domains either prevent or limit the size of microcracks and thereby give higher strength.

In addition to the selected mineral sources, plasticized batch mixtures suitable for the production of porous articles in accordance with the present description may comprise a pore forming agent. In particular embodiments the pore forming agent comprises at least one carbon source selected from the group consisting of starches and graphite.

The porosity of the porous articles will depend on the selection and concentration of any pore forming agent to be added. In general, porous composite articles provided in accordance with the present description will have porosities of at least 35% by volume. However, embodiments having porosities of at least 45% by volume, or at least 50% by volume, or even at least 55% by volume are readily achievable utilizing appropriate concentrations of one or more the above or functionally equivalent pore formers.

Particular embodiments of the disclosed composite articles comprise ceramic honeycomb bodies incorporating a principal β-spodumene phase constituting at least 50% by weight of the composite and a minor cordierite crystalline phase constituting more than 2% and less than 40% by weight of the body, or in some cases less than 30% by weight of the body. Remaining minor phases selected from the group consisting of glass, mullite, spinel, and/or corundum may be present but are not required. Such articles may exhibit no or low microcracking. In some embodiments low microcracking provides honeycomb bodies having a microcrack index ($Nb^3$) value below 0.20, such as below 0.10, the $Nb^3$ index being as defined by D. P. H. Hasselman and J. P. Singh in "Analysis of the Thermal Stress Resistance of Microcracked Brittle Ceramics," Am. Ceram. Soc. Bull., 58 (9) 856-60 (1979). In other embodiments low microcracking provides honeycomb bodies that show no increase in elastic modulus during heating from room temperature to 1000° C.

The composites of the disclosure have thermal expansion coefficients between room temperature and 800° C. of less than 1.6 ppm/° C., in some embodiments less than 1.4 ppm/° C., including less than 1.2 ppm/° C., or even below than 1 ppm/° C., as measured by dilatometry during heating of an axial specimen. An axial specimen is defined as a sample cut parallel to the lengths of the channels comprising the honeycomb ware. Composites with specific strengths (modulus of rupture divided by the density of the honeycomb ware) of greater than 1,400 psi·cm³/g, or greater than 1,800 psi·cm³/g, or even greater than 2000 psi·cm³/g, are provided. Modulus of rupture (MOR) is measured by the four-point method on an axial specimen.

The high specific strengths of the disclosed composites enable the fabrication of composite honeycomb structures having honeycomb volumetric (or so-called ware) densities of less than 0.3 g/cm³, or in some embodiments less than 0.250 g/cm³, or less than 0.16 g/cm³, or even less than 0.10 g/cm³, these low ware densities being realized through one or more of a decreased cell wall thickness, a high wall porosity, a low cell density, or any combination thereof. Volumetric densities of the ware are determined by weighing the mass of a cellular specimen, and dividing by the volume of the specimen as computed from the measured external dimensions of the cellular specimen. Honeycomb porosities of at least 50% by volume; or in some embodiments at least 55% by volume, are readily achievable at median pore diameters in the range of 2-20 µm, with cell wall thicknesses being below 4×10⁻³ in. Volume percent porosity and pore size distributions are as measured by mercury intrusion. Honeycomb composites can exhibit a strain tolerance (MOR/E) greater than 0.1%, and in some embodiments 0.12% or higher, or even 0.13% or higher. Young's elastic modulus (E) is measured by a sonic resonance technique on an axial bar cut parallel to the lengths of the channels and having essentially the same wall thickness and cell density (allowing for slight variability of cell geometry within the fired honeycomb part) as the specimen used for the measurement of MOR.

The disclosed composite articles are also characterized by high thermal shock parameters, defined for a honeycomb structure as the axial modulus of rupture strength divided by the elastic modulus of the composite material and divided again by the average thermal expansion coefficient of the structure as measured between room temperature (25° C.) and 800° C. Embodiments exhibiting thermal shock parameters of 800° C., or 1000° C., or even 1200° C. are provided.

As noted above, the present disclosure more generally encompasses porous ceramic bodies of essentially any selected configuration comprised of a principal phase of beta-spodumene and a minor phase of cordierite, with those phases together constituting more than 80% by weight of the body. Porous ceramic bodies comprising greater than 50% beta-spodumene and less than 40% cordierite by weight, or in certain cases greater than 70% beta-spodumene and less than 30% cordierite by weight are included within the scope of the disclosure. As also noted above, while the porous ceramic bodies may comprise optional crystalline phases including corundum and spinel, particular embodiments of the disclosed bodies will comprise less than 15% corundum by weight, and further embodiments will comprise less than 5% spinel by weight.

The particular distributions of crystal phases to be developed within the disclosed porous ceramic bodies are controlled through adjustments in porous body composition. Thus particular embodiments of the porous bodies will comprise less than 5.0 wt % MgO, and/or greater than 65 wt % $SiO_2$. Particular examples of the latter embodiments include porous ceramic bodies comprising greater than 65 wt % $SiO_2$ and greater than 2.5 wt % $Li_2O$. Other examples will comprise greater than 18 wt % $Al_2O_3$. Specifically included among the disclosed embodiments are porous ceramic bodies comprised of a principal phase of beta-spodumene and a minor phase of cordierite, wherein the body comprises greater than 65 wt % SiO2, greater than 2.5 wt % $Li_2O$, less than 5.0 wt % MgO, and less than 2 wt % glass.

The disclosed articles and methods are further described below with reference to a number of particular examples, which are intended to be illustrative rather than limiting.

Example A

Ceramic Compositions

Batch compositions and physical properties for a number of spodumene-cordierite composite materials are presented in Tables 1 and 2 below. Also reported for comparison are examples of cordierite materials, including a commercial cordierite used for the fabrication of catalyst substrates for engine emissions control (Composition C1), a lanthanum glass-containing non-microcracked cordierite (Composition C2), and a non-microcracked cordierite prepared from a predominantly mineral batch that is seeded with cordierite crystals to limit crystal domain size (Composition C3). The composite compositions made according to the present disclosure in Tables 1 and 2 are compounded utilizing an α-spodumene ore as the lithium source, that ore including 6% $Li_2O$, 25.3% $Al_2O_3$, and 64.6% $SiO_2$ by weight, with the remainder comprising trace amounts (<1% wt each) of $Fe_2O_3$, $Na_2O$, $K_2O$, $P_2O_5$ and $MnO_2$.

The batch compositions in Table 1 are reported in parts by weight. Included in Table 1 for each of the batch compositions reported are nominal weight percentages of oxides calculated to result from the firing of the batches at reaction-sintering temperatures.

Included in Table 2 where reported on selected examples from Table 1 are the sintering temperatures and times for converting the batch compositions in Table 1 to ceramic materials, the major crystalline phase assemblages developed during reaction-sintering, in percent by weight as determined by Reitveld x-ray diffraction, and selected physical properties for the fired cordierites and spodumene-cordierite composites.

TABLE 1

| Example Nos. | C1 | C3 | C2 | EX-0 | EX-1 | EX-2 | EX-3 | EX-4 | EX-5 | EX-6 |
|---|---|---|---|---|---|---|---|---|---|---|
| Talc 1 | 40.22 | | | | | | | 13.18 | 11.87 | 10.56 |
| Talc 2 | | 42.24 | 14.35 | | 21.12 | | | | | |
| Hydrous Kaolin 1 | | | 16.00 | | | | | | | |
| Calcined Kaolin | 17.29 | | | | | | | | | |
| Hydrous Kaolin 2 | 15.22 | | | | | | | | | |
| Boehmite | 2.00 | 6.00 | | | 3.00 | | | | | |
| Calcined Alumina 1 | 4.49 | 29.35 | 26.23 | 4.23 | 17.03 | 8.06 | 4.23 | | | |
| Calcined Alumina 2 | 13.53 | | | | | | | | | |
| Alpha Alumina | | | | | | | | 8.16 | 14.49 | 20.83 |
| Silica | 7.25 | 22.41 | 31.42 | 35.35 | 13.15 | 37.08 | 35.35 | 29.19 | 29.09 | 29.00 |
| Magnesium hydroxide | | | 12.00 | 4.04 | 1.55 | 6.01 | 4.04 | | | |
| Sieved α-Spodumene | | | | 56.38 | 44.16 | | | | | |
| Jet-milled α-Spodumene | | | | | | 48.85 | 56.38 | 49.46 | 44.55 | 39.62 |
| Cordierite seed | | 0.1 | | 1 | 1.0 | 1.0 | 1.0 | 1.0 | 1.0 | 1.0 |
| Yttrium oxide | | | | | 0.5 | | | | | |
| Lanthanum oxide | | | 1.0 | | | | | | | |
| Bentonite clay | | | 1.0 | | | | | | | |
| Sub-total of Inorganics | 100.0 | 100.1 | 102.0 | 101.0 | 101.5 | 101.0 | 101.0 | 101.0 | 101.0 | 101.0 |
| Graphite | | 20 | 15 | 20 | 20 | 20 | 20 | 20 | 20 | 20 |
| Methyl cellulose | 5 | 6 | 6 | 6 | 6 | 6 | 6 | 6 | 6 | 6 |

TABLE 1-continued

Batch Compositions

| Example Nos. | C1 | C3 | C2 | EX-0 | EX-1 | EX-2 | EX-3 | EX-4 | EX-5 | EX-6 |
|---|---|---|---|---|---|---|---|---|---|---|
| Starch (rice) | | 20 | 25 | 20 | 20 | 20 | 20 | | | |
| Cornstarch | | | | | | | | 20 | 20 | 20 |
| Sub-total of Pore Formers and Binder | 5 | 46 | 46 | 46 | 46 | 46 | 46 | 46 | 46 | 46 |
| Polyalpha olefin oil | 4.6 | 4.6 | 4.6 | 4.6 | 4.6 | 4.6 | 4.6 | 4.6 | 4.6 | 4.6 |
| Tall oil | 0.6 | 0.6 | 0.6 | 0.6 | 0.6 | 0.6 | 0.6 | 0.6 | 0.6 | 0.6 |
| Water | 23 | 33.5 | 32 | 25 | 25 | 32 | 31 | 32 | 32 | 31 |
| Grand Total | 133.2 | 184.8 | 185.2 | 182.2 | 177.7 | 184.2 | 183.2 | 184.2 | 184.2 | 183.2 |
| Oxide Compositions (weight percentages) - | | | | | | | | | | |
| $Li_2O$ | 0 | 0 | 0 | 3.53 | 2.19 | 3.08 | 3.53 | 3.08 | 2.77 | 2.46 |
| MgO | 13.8 | 13.8 | 13.8 | 2.83 | 7.00 | 4.23 | 2.83 | 4.23 | 3.81 | 3.38 |
| $Al_2O_3$ | 34.9 | 34.9 | 34.9 | 19.2 | 25.2 | 21.2 | 19.2 | 21.2 | 26.3 | 31.3 |
| $SiO_2$ | 51.4 | 51.4 | 51.4 | 74.4 | 65.6 | 71.5 | 74.4 | 71.5 | 67.2 | 62.8 |

TABLE 2

Fired Honeycombs - Phases & Properties

| Example Nos. | C1 | C2 | C3 | EX-0 | EX-0 | EX-1 | EX-2 |
|---|---|---|---|---|---|---|---|
| Cell density ($in^{-2}$)/Wall thickness (mil) | 600/3 | 600/3 | 600/3 | 200/12 | 200/12 | 200/12 | 600/3 |
| Sintering - Temperature (° C.) | 1380 | 1340 | 1360 | 1225 | 1235 | 1250 | 1220 |
| Time (hr) | 20 | 20 | 105 | 20 | 20 | 20 | 20 |
| XRD Phase assemblage - | | | | | | | |
| Spodumene | 0 | 0 | 0 | >90 | >90 | 47 | 79.9 |
| Cordierite | ~100 | ~100 | ~100 | <10 | <10 | 48 | 19.5 |
| Spinel | 0 | 0 | 0 | — | — | 5 | 0.7 |
| Corundum | 0 | 0 | 0 | — | — | 0 | 0 |
| Porosity (%) | 35 | 57 | 59.5 | 55.7 | 48.1 | 48.6 | 41 |
| Ware Density ($g/cm^3$) | 0.296 | 0.200 | 0.187 | 0.416 | 0.443 | 0.493 | 0.266 |
| Pore Size (μm) - $d_{50}$ | 7.1 | 1.75 | 4.4 | 28.8 | 42.6 | 6.1 | 9.21 |
| Strength (psi) | 345 | 597 | 532 | 275 | 328 | 1009 | 543 |
| Specific Strength ($psi \cdot cm^3/g$) | 1165 | 3190 | 2834 | 661 | 739 | 2046 | 2041 |
| Microcrack Index ($Nb^3$) | 0.465 | 0.034 | 0.004 | 0.280 | 0.417 | 0.071 | 0.095 |
| Elastic modulus (kpsi) | 641 | 425 | 242 | 309 | 354 | 1110 | 498 |
| CTE (ppm/K) RT-800° C. | 0.32 | 1.49 | 1.48 | 0.29 | 0.06 | 1.70 | 0.85 |
| 1000-200° C. | 0.86 | 1.97 | 1.87 | 1.29 | 1.16 | 2.16 | 1.30 |
| Strain Tolerance (%) | 0.054 | 0.140 | 0.22 | 0.089 | 0.093 | 0.091 | 0.109 |
| Predicted TSR (° C.)-Heating | Large | 940 | 1486 | Large | Large | 534 | 1280 |
| Cooling | 825 | 911 | 1376 | 890 | 999 | 620 | 1035 |

| Example Nos. | EX-2 | EX-2 | EX-3 | EX-4 | EX-5 | EX-6 |
|---|---|---|---|---|---|---|
| Cell density ($in^{-2}$)/Wall thickness (mil) | 600/3 | 600/3 | 600/3 | 600/3 | 600/3 | 600/3 |
| Sintering - Temperature (° C.) | 1200 | 1190 | 1190 | 1225 | 1250 | 1250 |
| Time (hr) | 20 | 20 | 20 | 20 | 20 | 20 |
| XRD Phase assemblage - | | | | | | |
| Spodumene | 80.9 | 81.5 | 93.0 | 83 | 73.2 | 64.8 |
| Cordierite | 17.7 | 16.8 | 6.7 | 17 | 17.4 | 19.1 |
| Spinel | 1.4 | 1.7 | 0.4 | 0 | 2.9 | 0 |
| Corundum | 0 | 0 | 0 | 0 | 6.5 | 17 |
| Porosity (%) | 48.8 | 49.4 | 51.6 | 49.7 | 56.4 | 54.6 |
| Ware Density ($g/cm^3$) | 0.266 | 0.239 | 0.236 | 0.219 | 0.189 | 0.197 |
| Pore Size (μm) - $d_{50}$ | 5.51 | 5.53 | 2.22 | 14.6 | 9.3 | 7 |
| Strength (psi) | 541 | 560 | 439 | 230 | 349 | 393 |
| Specific Strength ($psi \cdot cm^3/g$) | 2081 | 2342 | 1860 | 1050 | 1845 | 1995 |
| Microcrack Index ($Nb^3$) | 0.068 | 0.058 | 0.089 | 0.186 | 0.088 | 0.091 |
| Elastic modulus (kpsi) | 376 | 447 | 401 | 230 | 240 | 253 |
| CTE (ppm/K) RT-800° C. | 0.98 | 0.99 | 1.04 | 0.66 | 1.18 | 1.64 |
| 1000-200° C. | 1.38 | 1.39 | 1.33 | 1.25 | 1.48 | 1.94 |
| Strain Tolerance (%) | 0.144 | 0.125 | 0.109 | 0.100 | 0.145 | 0.155 |
| Predicted TSR (° C.)-Heating | 1460 | 1265 | 1050 | 1515 | 1231 | 947 |
| Cooling | 1240 | 1100 | 1025 | 1010 | 1183 | 1002 |

Example B

Catalyst Compatibility

The poisoning of catalyst surfaces by alkali components of sintered ceramics has been found to be a concern for β-spodumene catalyst substrates. Two mechanisms have been identified for the cases of a three-way-washcoat catalyst. The first arises because the pH of washcoating slurries is typically below four. The protons from the acidic washcoat slurry may therefore ion exchange with the lithium from the spodumene, and some of the lithium ions may then deposit on catalyst sites and poison catalyst activity. The second can arise because lithium may diffuse from spodumene and onto a catalyst at high temperatures. That process is accelerated by steam present in a combustion exhaust gas stream.

The potential for the possible poisoning of three-way catalysts supported on the disclosed composite spodumene-cordierite catalytic substrates by these mechanisms can be examined by comparing catalytic conversion efficiencies for propene, carbon monoxide and nitrous oxide over a catalyst deposited on each of a spodumene-cordierite composite honeycomb substrate and a conventional cordierite honeycomb substrate. The comparisons are made for samples supporting a freshly deposited catalyst and for samples supporting the same catalyst after aging the catalyzed substrates at 950° C. for 24 hours in 10% steam.

The spodumene-cordierite composite selected for testing was a honeycomb substrate of composition EX-1 disclosed in Tables 1 and 2 above, the honeycomb structure having a nominal cell density of 200 cell/in$^2$ of honeycomb cross-section and a cell wall thickness of $12 \times 10^{-3}$ inches. That composition produced a phase assemblage providing roughly equivalent amounts by volume of cordierite and spodumene phases after firing. The reference cordierite substrate, of comparative ceramic composition C3 from Tables 1 and 2 above, had a honeycomb cell density of 400 cells/in$^2$ and a cell wall thickness of $10 \times 10^{-3}$ inches.

Each of the samples selected for catalyst coating and testing was a honeycomb section about 50 mm in diameter and 150 mm in length. Each sample was vacuum-coated with a catalyzed washcoat mixture to produce a washcoat loading of about 0.1 g/cm$^3$ of honeycomb volume, that washcoating yielding a catalyst concentration of about 200 g/ft$^3$. The catalyst used is a three-way Pt—Pd—Rh catalyst. The washcoated substrates were dried at 70° C. overnight and then calcined at 550° C. for 3 hrs. One-inch long honeycomb sections were then cut from each of the larger samples for catalyst testing.

The catalytic efficiency tests were carried out using a model exhaust gas consisting of 14% $CO_2$, 10% $H_2O$, 0.49% $O_2$, 0.5% CO, 0.17% $H_2$, 0.12% $C_3H_6$, 0.05% NO, and the balance $N_2$ by volume. Steady-state conversions were measured as a function of temperature by ramping sample and gas temperatures from 110° C. to 450° C. at a heating rate of 0.5° C./second, and at three different space velocities of 30, 60, and 100 hr$^{-1}$. A summary of the results in terms of the temperatures measured to reach 60% conversion of each of the propene, carbon monoxide, and nitrous oxide present in the model exhaust gas is provided in Table 3 below.

TABLE 3

Catalytic Conversion Results

Temperatures at 60% Conversion (° C.)

| | | Propene Space Vel. (K/hr) | | | Carbon Monoxide Space Vel. (K/hr) | | | Nitrous Oxide Space Vel. (K/hr) | | |
|---|---|---|---|---|---|---|---|---|---|---|
| | | 30 | 60 | 100 | 30 | 60 | 100 | 30 | 60 | 100 |
| | | Temperatures (° C.) | | | Temperatures (° C.) | | | Temperatures (° C.) | | |
| Spodumene-Cordierite Honeycomb | Fresh | 306 | 321 | 337 | 217 | 223 | 231 | 239 | 244 | 252 |
| | Aged | 401 | 394 | 399 | 217 | 220 | 231 | 239 | 240 | 252 |
| Cordierite Honeycomb | Fresh | 311 | 308 | 315 | 222 | 224 | 224 | 243 | 244 | 244 |
| | Aged | 403 | 400 | 407 | 212 | 210 | 230 | 235 | 231 | 251 |

The data in Table 3 suggest that the temperatures for 60% conversion of propene, carbon monoxide, and nitrous oxide over a fresh catalyst are similar to or slightly lower for the spodumene-cordierite composite honeycomb than for the cordierite honeycomb, indicating similar or slightly improved performance for the composite. In the fresh catalyst condition there is no evidence of any catalyst poisoning effect due to an ion exchange of protons with lithium during the washcoating process.

The hydrothermal aging treatment employed to simulate aged catalyst performance as reported in Table 3 simulates a significant period of exhaust system use, and so is a useful tool for catalytic efficiency comparisons. For the samples evaluated in Table 3 the data indicate 60% conversion temperatures for all three pollutants that are similar for the spodumene-cordierite composite sample and the cordierite sample. Also spodumene-cordierite composite catalytic conversion curves for the aged sample are absent profile changes that might indicate catalyst poisoning or washcoat sintering from harmful washcoat-substrate interactions.

FIG. 1 of the drawings compares the fresh and hydrothermally aged catalytic performance of one example of a composite substrate (Table 2 example EX-5) with that of a representative commercial cordierite substrate (Table 2 example C1). The cell densities and wall thicknesses of the two substrates are nominally equivalent. The hydrothermal aging treatment as well as the catalyzed washcoating procedures and loadings are as described Example B above.

Two modes of catalyst operation were employed for testing. The first mode, termed the light-off (LO) mode, tested catalyst performance under a rapid heating condition wherein catalyst operating temperatures are rapidly raised from 110 to 450° C. at 1000° C./min. The second mode of operation, termed the steady-state (SS) mode, tested catalyst performance under a slow heating condition wherein catalyst operating temperatures are raised at 30° C./min. The sample identifications and testing modes for each sample are reported along the horizontal axis of the drawing.

In both operating modes, catalyst performance is rated by (i) the aging-induced time increase (Δt in percent as shown on the vertical axis) for a simulated exhaust gas passing through the catalyzed substrates to reach an outlet temperature of 250° C. (Δt O.T. 250° C.), and (ii) the aging-induced time increase for the catalyst to reach 50% conversion efficiency for each of carbon monoxide (Δt 50% CO), nitrogen oxide (Δt 50% NO) and propylene (Δt 50% $C_3H_6$).

FIG. 1 shows that the change in time for substrate outlet temperatures to reach 250° C. is negligible after aging for both substrates and in both operating modes, since this parameter is a measure of thermal response alone and not catalytic activity. The data also indicate that all times to reach 50% conversion efficiency increase significantly for both substrates and in both operating modes following hydrothermal aging. Those increases are due to a combination of washcoat sintering and catalyst coarsening. However, larger increases will be expected where the effects of the aging treatment are more damaging, as for example where poisoning of the catalyst might have occurred.

The 50% conversion results after aging are similar for both substrate materials. There is no indication of disproportionately large increases in 50% conversion times for the EX-5 spodumene-cordierite composite that would indicate catalyst poisoning, for example, by a migration of lithium onto active sites of the catalyst. To the contrary, the effects of aging on catalyst performance appear to be proportionately less for the spodumene composite substrate than for the cordierite substrate.

Figure 2:
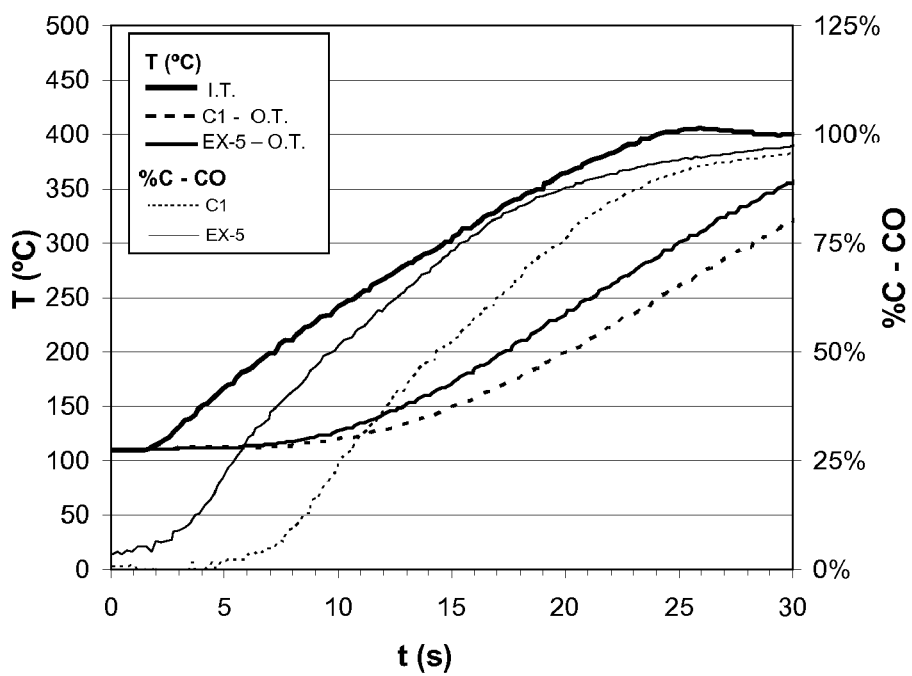
FIG. 2 is a graph presenting data respecting heat-up and conversion efficiencies for cordierite and composite spodumene-cordierite honeycombs.

On an absolute performance basis, the hydrothermally aged composite cordierite-spodumene honeycombs appear to exhibit somewhat better heat-up and conversion efficiency than the aged cordierite honeycombs. FIG. 2 of the drawings presents plots over time of honeycomb inlet and outlet temperatures and the resulting CO conversion levels for each of an EX-5 composite honeycomb and a C1 cordierite honeycomb when evaluated for heat-up and conversion performance after hydrothermal aging with a synthetic exhaust gas such as described in connection with Table 3 above.

The time of testing in FIG. 2 is reported in seconds on the horizontal axis (t(s)) in the figure, and the carbon monoxide conversion efficiencies (% C—CO) for the samples, each sample being tracked by the plot line indicated in the key, are reported on the right-hand vertical axis. The exhaust gas inlet temperatures (I.T.), and exhaust gas outlet temperatures for each of the samples (C1 O.T. and EX-5 O.T.), also tracked by plot lines as indicated in the key, are reported on the left-hand vertical axis.

Referring to FIG. 2, a faster thermal response and earlier time to 50% CO conversion are observed for the slightly less dense EX-5 composite substrate than for the C1 cordierite substrate after hydrothermal aging of both substrates as above described. In addition, the 50% CO conversion level for the EX-5 sample is reached in about 10 seconds, versus about 15 seconds for the C1 sample.

Example C

Catalyst Substrate Stability

The effects of washcoating on the properties of catalyst substrates can be significant, and include changes resulting from the calcination of an initially applied washcoating layer as well as changes accruing following a prolonged period of thermal cycling in service.

Table 4 below presents data comparing the influence of washcoating and thermal aging on the physical properties of cordierite and spodumene-cordierite composite honeycomb articles. Honeycombs of four different compositions are compared, including the EX-2 spodumene-cordierite composite composition of Tables 1 and 2, cordierite compositions C2 and C3 as reported in Tables 1 and 2, and an additional commercial cordierite honeycomb composition C4 that has been widely used in automotive exhaust systems.

Included in Table 4 for each of the honeycomb samples tested are physical property values for modulus of rupture (MOR) strength, elastic modulus (EMOD), strain tolerance (ST), average coefficients of thermal expansion (CTE) and thermal shock parameters (TSP) over intervals of heating and cooling, as well as ware (honeycomb volumetric) densities, porosities, and median pore diameters ($d_{50}$) for the unaged, uncoated honeycombs. The physical property values are reported for four different sample conditions: (i) uncoated, (ii) uncoated but aged, (iii) washcoated, and (iv) washcoated and aged. The aging treatment was a hydrothermal aging treatment involving heating at 950° C. for 24 hr in 10% $H_2O$ vapor.

TABLE 4

Honeycomb Physical Properties

| Honeycomb Composition | Honeycomb Condition | MOR (psi) | EMOD (kpsi) | ST (%) | CTE (ppm/K) Heating RT-800 | CTE (ppm/K) Cooling 1000-200 | TSP (° C.) Heating RT-800 | TSP (° C.) Cooling 1000-200 | Density (g/cm³) | Porosity (%) | $d_{50}$ (μm) |
|---|---|---|---|---|---|---|---|---|---|---|---|
| EX-2 | Uncoated | 588 | 447 | 0.132 | 0.99 | 1.37 | 1329 | 1164 | 0.239 | 48.3 | 5.4 |
|  | Aged | 549 | 433 | 0.127 | 1.01 | 1.36 | 1255 | 1133 | — | — | — |
|  | Coated | 606 | 468 | 0.130 | 1.07 | 1.42 | 1210 | 1112 | — | — | — |
|  | Coated-Aged | 523 | 425 | 0.123 | 1.01 | 1.30 | 1218 | 1143 | — | — | — |
| C4 | Uncoated | 433 | 721 | 0.060 | 0.47 | 1.03 | 1278 | 782 | 0.283 | 35.0 | 7.1 |
|  | Aged | 411 | 745 | 0.055 | 0.61 | 1.19 | 903 | 662 | — | — | — |
|  | Coated | 482 | 886 | 0.054 | 0.84 | 1.34 | 648 | 606 | — | — | — |
|  | Coated-Aged | 448 | 724 | 0.062 | 0.52 | 1.20 | 1190 | 716 | — | — | — |
| C2 | Uncoated | 358 | 237 | 0.151 | 1.36 | 1.85 | 1110 | 1018 | 0.184 | 61.8 | 3.6 |
|  | Aged | 326 | 271 | 0.120 | 1.41 | 1.84 | 854 | 853 | — | — | — |
|  | Coated | 327 | 264 | 0.124 | 1.34 | 1.92 | 924 | 846 | — | — | — |
|  | Coated-Aged | 183 | 238 | 0.077 | 1.20 | 1.70 | 641 | 652 | — | — | — |
| C3 | Uncoated | 548 | 495 | 0.111 | 1.43 | 1.97 | 775 | 756 | 0.232 | 58.1 | 1.8 |
|  | Aged | 560 | 501 | 0.112 | 1.49 | 1.96 | 750 | 770 | — | — | — |
|  | Coated | 547 | 548 | 0.100 | 1.42 | 1.92 | 703 | 720 | — | — | — |
|  | Coated-Aged | 503 | 524 | 0.096 | 1.38 | 1.98 | 696 | 685 | — | — | — |

Table 4 indicates that the spodumene-cordierite composite honeycombs exhibit combinations of properties not attainable in any of the cordierite-based compositions. For the spodumene-cordierite composite, the strength, thermal expansion coefficient and elastic modulus are largely insensitive to the washcoating and hydrothermal aging treatments employed. In contrast, the thermal expansion coefficient of the C4 honeycomb is particularly sensitive to washcoating, increasing by approximately 75% after the washcoating treatments. Further, the strength of the C2 cordierite honeycomb drops by approximately 50% after washcoating and aging.

The specific strength of the spodumene composite is about 2,100 psi·cm$^3$/g, similar to that of the C3 non-microcracked cordierite honeycomb prior to washcoating and more than sufficient to achieve ware volumetric densities down to 0.10 g/cm$^3$. Further, the predicted thermal shock parameters (TSP) for the composite are above 1100° C. for both heating and cooling events as a consequence of the lower thermal expansion coefficient and high strain tolerance.

High thermal shock resistance in a honeycomb substrate material is required in order that the substrate can withstand washcoat calcination and thermal cycling in use. To compare the thermal shock resistance of spodumene-cordierite composite honeycombs to conventional cordierite honeycombs, oven thermal shock testing can be used. The honeycombs are first washcoated and calcined at 550° C. for 3 hours, cooled to room temperature, and then plunged into an oven operating at 600° C. for a 30 minutes equilibration period. The samples are then extracted rapidly into room temperature air for cooling and inspected for cracks. This heating/cooling cycle is repeated three times at each temperature, with the temperature being raised 50° C. after each group of cycles.

Figure 3:
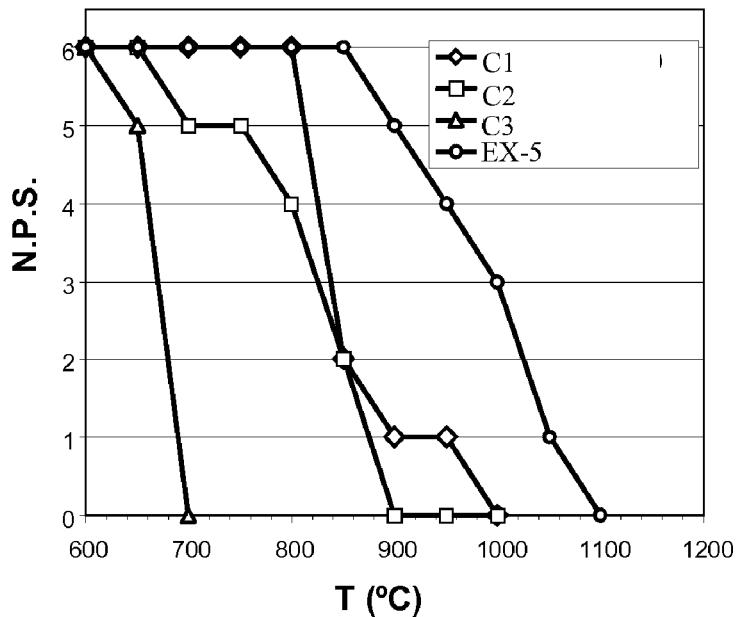
FIG. 3 is a graph illustrating the number of washcoated honeycomb substrates formed of various ceramic materials that survive increasingly severe thermal shock treatments.

FIG. 3 of the drawings plots results for this series of thermal shock tests as conducted on a composite spodumene-cordierite honeycomb (Table 2 example EX-5) and three cordierite honeycombs (Table 2 examples C1, C2 and C3), all honeycombs having a cell density of approximately 600 cells/in$^2$ and a cell wall thickness of 3×10$^{-3}$ inches. Six samples two inches in diameter and 5 inches in length of each honeycomb composition were selected for testing. The plots in FIG. 3 indicate the number of parts/samples surviving (N.P.S.) the testing procedure on the vertical axis at each temperature level (T) shown on the horizontal axis. The data clearly reflect the superior thermal shock resistance of the spodumene-cordierite composite honeycombs.

In some embodiments, the spodumene-cordierite composite articles and devices provided herein have specific strengths above 1,600 psi·cm$^3$/g, and even above 2,000 psi·cm$^3$/g, as well as reduced strength losses (ΔMOR<15%) arising through thermal cycling and in service. These characteristics allow composite honeycombs to meet a 200 psi axial MOR requirement at honeycomb volumetric densities below even 0.16 g/cm$^3$, enabling the use of catalyst substrates and filters with high porosity and thin cells walls.

Embodiments of these spodumene-cordierite composites can exhibit average thermal expansion coefficients (room temperature to 800° C.) below 1.2 ppm/° K and strain tolerances above 0.1%. This combination of properties secures excellent thermal shock resistance in honeycomb bodies, and the low heat capacities of the composites, which are similar to those of cordierite, provide fast light-off capabilities.

The foregoing combination of honeycomb properties supports the fabrication of a variety of combustion engine exhaust emissions control devices offering improved performance. The environment of a close-coupled catalytic converter is an especially difficult one. More than 75% of the emissions from spark-ignited gasoline-fueled engines arise during engine cold-start, when the catalysts in the converters are too cold to process pollutants. Reducing the time to light-off of the catalysts is a direct way to lower these emissions. The time to light-off is proportionate to the density of the coated substrate; a lighter converter heats more quickly. For example, one set of embodiments of a close-coupled catalytic converter substrate has a light-off speed 20-25% faster than current converter designs can provide, and given washcoat loadings of, for example, about 0.15-0.30 g/cm$^3$, a reduction in honeycomb volumetric density (the density of a volume of honeycomb structure including both cell walls and open cells) of approximately 40% is provided.

Embodiments herein include a combustion engine exhaust emissions control device selected from the group consisting of close-coupled engine exhaust converters, gasoline engine particulate exhaust filters, and NOx integrated engine exhaust filters, wherein the device comprises a composite spodumene-cordierite honeycomb body having a honeycomb volumetric density of less than 0.3 g/cm$^3$. Particular examples of such devices include a close-coupled engine exhaust converter incorporating a composite honeycomb body having a porosity greater than 35% by volume and a cell wall thickness below 4×10$^{-3}$ inches, a gasoline engine particulate exhaust filter incorporating a composite honeycomb body having a porosity greater than 55% by volume and a cell wall thickness below 4×10$^{-3}$ inches, and an NOx integrated engine exhaust filter comprising a composite honeycomb body having a porosity greater than 55% by volume and a cell wall thickness below 12 mils.

Embodiments of the spodumene-cordierite composite honeycombs disclosed herein that are intended for use in three-way and oxidative catalytic applications should have ultra-low bulk (ware) densities, generally not exceeding 0.2 g/cm$^3$ and in some embodiments from 0.12-0.16 g/cm$^3$ where rapid light-off of a catalyst supported on the honeycombs is required. At these low bulk densities the amount of material available to support external loads on the honeycombs is quite limited. Accordingly a spodumene-cordierite composite material with a high specific strength, i.e., a specific strength adequate to provide an application level strength of at least 200 psi in the cellular (honeycomb) shape, should be selected. Honeycombs with lower strengths cannot withstand the forces typically encountered for canning and other handling related to the intended application. In general, a spodumene-cordierite composite ceramic with sufficient material strength to provide a specific strength level of at least about 1700 psi·cm$^3$/g in a honeycomb configuration should be chosen for such applications.

The level of microcracking developed in composite spodumene-cordierite ceramic materials during firing and in subsequent use has a substantial effect on the strength of the material. Microcracking also affects the thermal expansion coefficient of the material, which along with strength dictates the thermal shock resistance of composite honeycombs, and thus their suitability for use in, for example, close-coupled catalyst devices.

Figure 4:
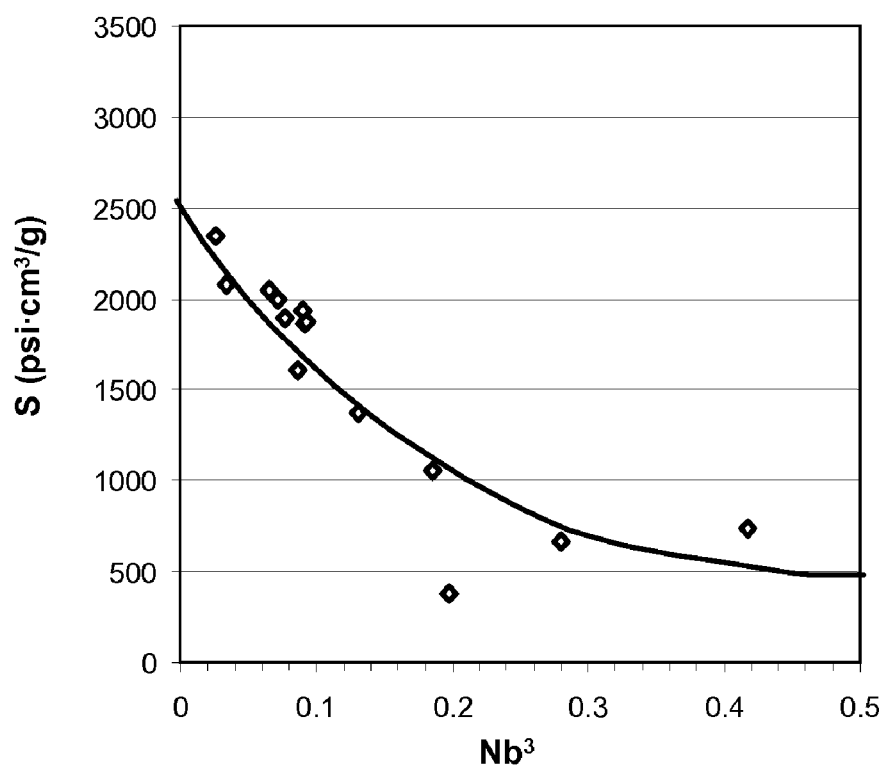
FIG. 4 is a plot of specific strength as a function of microcrack index in a composite ceramic material.

Spodumene, like cordierite, is anisotropic and therefore subject to microcracking. To achieve the required levels of strength and thermal shock resistance in spodumene-cordierite honeycombs, therefore, the level of microcracking must be limited. FIG. 4 of the drawings illustrates the effect of microcracking on the specific strength of a representative microcracked spodumene-cordierite ceramic material. That figure comprises a plot of specific strength versus microcrack index Nb$^3$, with strength (S) as determined by four-point modulus of rupture testing being scaled in psi·cm$^3$/g on the vertical axis and the microcrack index Nb$^3$ being scaled on the horizontal axis. As the data in FIG. 4 suggest, embodiments of the disclosed composite materials exhibiting the strength/microcracking characteristics plotted in FIG. 4 should have $Nb^3$ microcrack indices below 0.2, or even below 0.1, to provide satisfactory strength for use in such devices.

As known in the art and referenced above, the microcrack index ($Nb^3$) of a given microcracked ceramic composition is a function of the room temperature elastic modulus of the composition in the microcracked state and the elastic modulus of a non-microcracked sample of the same composition at room temperature. The room temperature elastic modulus of a non-microcracked ceramic material is generally determinable by extrapolation from the rate of change of the elastic modulus of the non-microcracked material with temperature. The microcrack indices for cordierite reported herein are derived from elastic moduli determined by that method.

Data concerning the temperature dependence of elastic modulus for the case of non-microcracked spodumene have not been found in the literature, but the rate of change of that modulus with temperature is expected to approximate the rate of change for cordierite since the bonding strengths of the two aluminosilicate materials are similar. Accordingly the latter rate is used to calculate the microcrack indices for the spodumene-cordierite ceramics reported herein. Further information relating to the evaluations of the $Nb^3$ microcrack index is disclosed in published patent application WO2009/108357 and U.S. Pat. No. 7,618,699.

Figure 5:
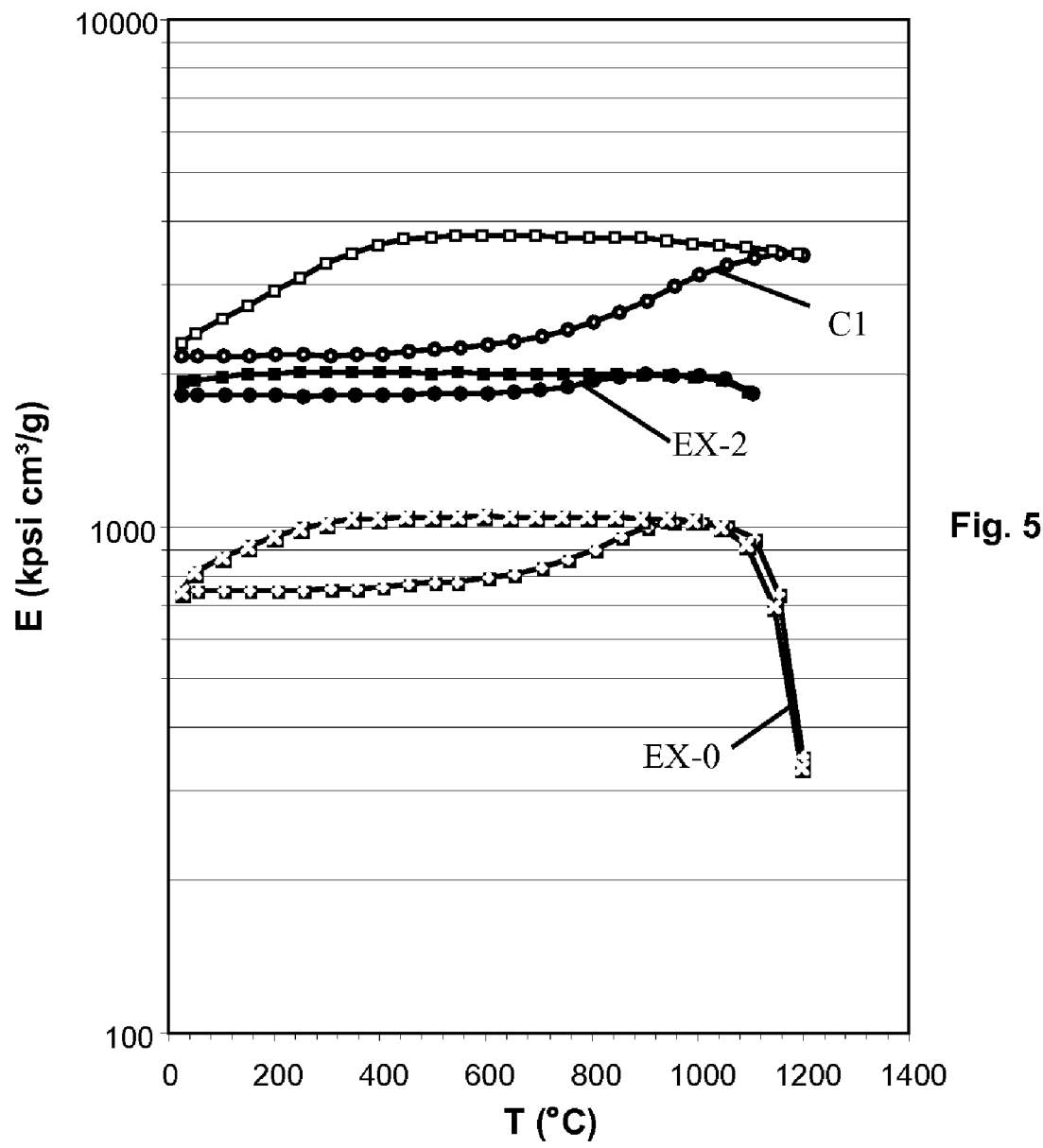
FIG. 5 plots specific elastic modulus as a function of temperature for three microcracked ceramic materials.

FIG. 5 of the drawings presents plots of elastic modulus as a function of temperature measured during the heating and cooling of three microcracked ceramic materials described in the present disclosure. The materials include cordierite material C1 and spodumene-cordierite materials EX-0 (fired at 1225° C.) and EX-2 (fired at the 1220° C.) reported in Table 2. Specific elastic modulus values (E) are indicated in kpsi·cm$^3$/g on the vertical axis and sample temperatures (T) are indicated in ° C. on the horizontal axis. The heating data are recorded on the lower curves and the cooling data on the upper curves in each case.

In general, a larger swept area between the heating and cooling curves for these materials indicates a higher level of microcracking and a higher $Nb^3$ microcrack index. Thus the C1 example has a higher index than the EX-0 sample, which in turn has a higher index than the EX-2 sample.

Limiting microcracking in spodumene-containing compositions made by ceramic processing in accordance with the present disclosure has been considered difficult because spodumene has a larger anisotropy in thermal expansion coefficient than cordierite. Thus specific strengths in the range of about 500-1200 psi·cm$^3$/g have previously been observed in non-stoichiometric spodumene ceramic honeycombs of relatively high bulk density, e.g., honeycombs with channel walls on the order of 0.012 inches thickness. Those strengths, being indicative of microcrack indices $Nb^3$ between about 0.2-0.5 on the curve of FIG. 4 of the drawings, are too low to render the honeycombs suitable use for use in fast light-off catalytic applications.

Embodiments of the presently disclosed high-strength spodumene-cordierite honeycombs that are particularly well suited for use in fast light-off applications are those having porosities above 50%, and in particular embodiments with mean pore sizes below 10 μm. Small mean pore sizes advantageously assist in the localization of catalyst washcoats on channel wall surfaces of the support honeycombs. Excessive penetration of washcoat materials into the pores of honeycomb walls has been shown to degrade catalytic activity by retarding the diffusion of gaseous species toward active catalytic sites on washcoat materials within the walls.

Further embodiments of the presently disclosed honeycombs offer the advantage of high strain tolerance, e.g., a strain tolerance of at least 0.1%. High strain tolerance in combination with a low coefficient of thermal expansion (cooling) imparts high thermal downshock resistance to these honeycombs. Thus embodiments of the disclosed honeycombs with thermal shock resistances on cooling of at least 1000° C. are provided.

In the practice of the disclosed methods for making spodumene-cordierite honeycomb bodies, naturally occurring batch materials like α-spodumene and petalite ores are available as low cost sources of lithium, with other batch materials being the same as or similar to those employed for cordierite honeycomb production. Advantageously, all of these various batch materials are compatible with existing extrusion forming processes and rheological systems.

While the articles, methods and devices of the present disclosure have been described above with reference to particular examples and embodiments, it will be recognized that those descriptions have been offered for purposes of illustration only, and that various modifications of the disclosed embodiments may be adapted for particular purposes within the scope of the appended claims.

What is claimed is:

1. A porous ceramic body comprised of a principal phase of beta-spodumene and a minor phase of cordierite, wherein the beta-spodumene and cordierite phases together constitute more than 80% by weight of the body, and wherein the body contains less than 4 wt % glass.

2. The body of claim 1 wherein the beta-spodumene and cordierite phases together constitute more than 90% by weight of the body.

3. The body of claim 1 wherein the body contains less than 2% glass.

4. The body of claim 1 wherein the body comprises greater than 50% beta-spodumene and less than 40% cordierite by weight.

5. The body of claim 1 wherein the body comprises greater than 70% beta-spodumene and less than 30% cordierite by weight.

6. The body of claim 1 wherein the body further comprises less than 15% corundum by weight.

7. The body of claim 1 wherein the body further comprises less than 5% spinel by weight.

8. The body of claim 1 wherein the body has a total porosity of greater than 40% as measured by mercury intrusion porosimetry.

9. The body of claim 1 wherein the body has a total porosity of 40 to 60% as measured by mercury intrusion porosimetry.

10. The body of claim 1 wherein the body has a median pore size of less than 20 μm.

11. The body of claim 1 wherein the body comprises less than 5.0 wt % MgO.

12. The body of claim 1 wherein the body comprises greater than 65 wt % $SiO_2$.

13. The body of claim 1 wherein the body comprises greater than 65 wt % $SiO_2$ and wherein the body comprises greater than 2.5 wt % $Li_2O$.

14. The body of claim 1 wherein the body comprises greater than 18 wt % $Al_2O_3$.

15. A porous ceramic body comprised of a principal phase of beta-spodumene and a minor phase of cordierite, wherein the body comprises greater than 65 wt % $SiO_2$, greater than 2.5 wt % $Li_2O$, less than 5.0 wt % MgO, and less than 2 wt % glass.

* * * * *